United States Patent [19]

Lhospice

[11] Patent Number: 4,790,644
[45] Date of Patent: Dec. 13, 1988

[54] GLASSES FRAME
[75] Inventor: Bernard Lhospice, Blois, France
[73] Assignee: Essilor International (Compagnie Generale d'Optique), Creteil Cedex, France
[21] Appl. No.: 931,692
[22] Filed: Nov. 14, 1986
[30] Foreign Application Priority Data
Nov. 25, 1985 [FR] France .................. 8517390
[51] Int. Cl.[4] ................................ G02C 1/08
[52] U.S. Cl. ........................ 351/90; 351/99
[58] Field of Search ............... 351/90, 95, 153, 102
[56] References Cited
U.S. PATENT DOCUMENTS

| 1,546,485 | 7/1925 | Fraser | 351/90 |
|---|---|---|---|
| 1,932,261 | 10/1933 | Beattey | 351/90 |
| 3,589,802 | 6/1971 | Amaru | 351/90 |
| 3,902,796 | 10/1975 | Page | 351/90 |
| 3,941,461 | 3/1976 | Lambert | 351/153 |
| 4,339,179 | 7/1982 | Dang | 351/153 |

FOREIGN PATENT DOCUMENTS

| 2726071 | 12/1977 | Fed. Rep. of Germany | 351/153 |
|---|---|---|---|
| 56-142511A | 6/1981 | Japan | 351/90 |
| 154988 | 3/1984 | United Kingdom | 351/90 |

Primary Examiner—Rodney B. Bovernick
Assistant Examiner—Jay Ryan
Attorney, Agent, or Firm—Burgess, Ryan & Wayne

[57] ABSTRACT

This frame, comprising for each of the lenses to be supported an open metallic eye-piece and of which the ends are adapted to abut one against the other by means of a mutually screwing member is characterized in that the two ends of the metallic eye-piece cooperate with a common guiding groove provided in a connecting lug so that, by relative engagement of its ends in the groove, they are perfectly aligned one in the extension of the other.

2 Claims, 1 Drawing Sheet

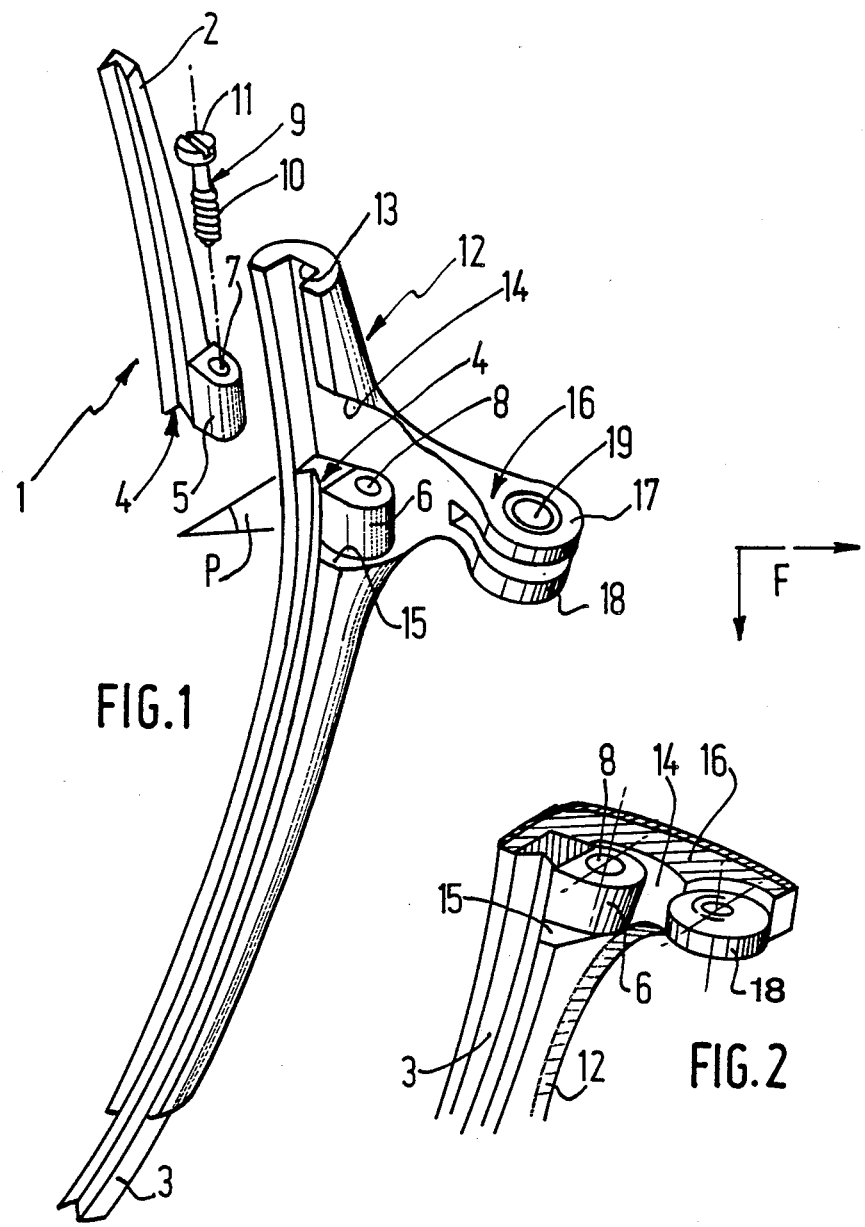

GLASSES FRAME

BACKGROUND OF THE INVENTION

1. Field of the Invention

The present invention relates to a glasses frame or analogue optical accessory, allowing to facilitate the mounting inside a support of each of the ophthalmic lenses and to ensure, once the mounting has been achieved, reliable immobilization or securing of each lens so that the lens is unable to escape from the frame even under the effect of a shock or an effort accidentally exerted thereon.

Description of the Prior Art

It is known that glasses frames are usually produced, either from a material that is relatively resilient, such as plastic material or shell material, for example, or from a metal, this latter solution generally allowing to render the frame very fine as well as light-weight.

Nevertheless, to allow the reliable placing in position of lenses in this type of metallic frame, and to ensure the effective immobilization of these lenses once they have been mounted, it is already known to provide each eye-piece or generally rounded form of the frame, adapted to receive corrective lens, with a transversal slot that opens the eye-piece and allows through the resiliency of the metal, to surround the lens over its entire periphery by the metallic part opposite the frame. At each end of the eye-piece is provided a retaining block. The two ends of the eye-piece must be in abutment and made integral with the other, generally through means of a screw that cooperates with the two retaining blocks. This arrangement gives rise to difficulties, especially for the two parts of the eye-pieces to be exactly placed in the extension and upon contact with each other, while suitably pressing the lens.

SUMMARY OF THE INVENTION

The present invention concerns an adjustable glasses frame, in particular produced in metal at least in its part that surround the corrective or protective lenses, and which allows to overcome the drawbacks of the former solutions known up till now.

For this purpose, the present frame comprising for each of the lenses to be supported an open metallic eye-piece of which the two ends are adapted to be in abutment one against the other, is characterized in that the two ends of the metallic eye-piece cooperate with a common guiding groove provided in a connecting lug so that, through relative engagement of the two ends in the groove, one is exactly aligned in the extension of the other.

Advantageously and in a manner known per se, the two opposite ends of the metallic eye-piece each comprise a lateral retaining block, secured into or integrally manufactured on the side of the eye-piece, at least one of these retaining blocks being provided with a threaded bore for receiving a screw for securing together the ends of the eye-piece.

Furthermore, one of the ends of the eye-piece is preferably secured in the guiding groove, while the other end is slidably mounted in said groove.

According to another feature, the connecting lug comprises an open recess in which are embedded and fitted both of the lateral retaining blocks, this recess communicating with the guiding groove receiving the two ends of the eye-piece.

In one particular variant of the invention, the connecting lug is laterally extended by a hinge element for the pivoting on the lug of one of the arms of the glasses and in another opposite embodiment, the correcting lug is laterally extended by a supporting element of the nasal rest piece of the spectacles.

BRIEF DESCRIPTION OF THE DRAWINGS

The features and advantages of a glasses frame according to the invention will become apparent from the following description of an embodiment according to several variants thereof, given by way of non-limitative illustration, referring to the appended drawing in which:

FIG. 1 is a partial perspective view of a glasses frame produced according to the invention;

FIG. 2 is a partial perspective view of FIG. 1 along a cross-section in plane P at FIG. 1;

FIG. 3 is a view from above according to the arrow F of FIG. 2.

DESCRIPTION OF THE PREFERRED EMBODIMENTS

As represented in FIG. 1, the glasses frame of the present invention, designated by the general reference numeral 1, is constituted by means of an open metallic eye-piece of which the ends 2 and 3 respectively, are separated from one another by a transversal cut providing at the tip of each of each of these ends an opposite face 4. The ends 2 and 3 of the metallic eye-piece each comprise a lateral retaining block, respectively 5 and 6, secured thereto by welding or any other analogous means on the side of each end, or even integrally manufactured with the metallic eye-piece itself. At least one of these blocks, for example block 6, comprises a threaded bore 8. A screw 9 crosses through the bore 7 of the block 5 and is engaged in the threaded hole 8 of the block 6 allowing the tightening of the two blocks 5, 6 in abutment one against the other on their opposite faces 4.

The metallic eye-piece can thus ensure the mounting and the immobilization of a corrective lens (not represented) by the setting in position and the suitable tightening of it with the ends of the eye-piece brought closer together by means of the screw.

However, it will be evident that without, particular complementary dispositions, the setting in position of the screw and the suitable abutment Of the retaining blocks 5 and 6 in their perfect extension is difficult to achieve, especially without provoking prejudicial torsions on the ends 2 and 3, which would lead to a defective positioning of the associated lens.

In order to overcome this drawback and according to the invention, the ends 2 and 3 of the metallic eye-piece are guided by a lug 12 provided with a continuous and elongated groove 13 where its ends are engaged. Preferably, the lug 12 presents an open housing 14, of large enough dimensions to allow that the retaining blocks 5 and 6 be fitted and embedded within.

According to one particular embodiment, the end 3, for example, of the metallic eye-piece is secured by crimping, welding or any other means, in the lug 12 in such a manner that its retaining block 6 especially bears on a portion 15 of the recess 14, while the other end 2 can slide freely in the groove 13 until it forces the blocks 5 and 6 to abut one another so that said blocks are in exact alignment, the screw 9 being able to be mounted in the threaded bore 8 without any risk of warping or buckling of the metallic eye-piece.

The lug 12 advantageously comprises a lateral piece 16 extended by two parallel parts 17 and 18 forming one of the elements of a hinge on the lug and thereafter on the frame 1 of one of the lateral side-pieces of the glasses (not represented) by means of a screw engaged in a threaded hole 19 provided i the parts 17 and 18.

A glasses frame having a simple design is thus produced that, with a metallic eye-piece, allows easy mounting and immobilization of a corrective or protective lens, without risks of transversal or lateral forces that are prejudicial to the lens itself, this lens, once in position, being pressed in the eye-piece by the moving closer of its two ends in the plane of the lens with a constant guiding of the ends to be moved closer until their abutment in the exact extension of each other.

It is well understood that the present invention is in no way limited to the embodiment described and represented in its particular variant, but on the contrary encompasses all variants. More especially, it is equally possible within the framework of the invention to place the lug on the side of the support element of the nasal rest piece, usually mounted between the eye-pieces corresponding to the two lenses of the glasses.

What is claimed is:

1. An adjustable eyeglass frame comprising: two open metallic rim-pieces, each for supporting an eyeglass lens in the frame, each said rim piece including two free ends adapted to about against each other, each free end having a lateral retaining block with screw receiving means for receiving a screwing member;

a connecting lug associated with each rim piece, each said connecting lug including a continuous elongated guiding grooves means for precisely aligning said free ends of the associated rim piece with respect to each other, and an open recess in communication with the guiding groove means;

one of said ends of each said rim piece being secured in the guiding groove means of the associated connecting lug and the other end of said rim piece being slidably mounted in said continuous elongated guiding groove means so as to be placed in precise alignment with respect to said one end;

said lateral retaining blocks of each said rim piece being positioned in the recess of the associated connecting lug so as to limit relative sliding displacement of said two ends with respect to each other; and one screwing member received in the screw receiving means of each of the thus positioned lateral retaining blocks of each said rim piece for securing said ends of each said rim piece together in precise alignment.

2. A frame according to claim 1, wherein each connecting lug includes a hinge element laterally extending therefrom for pivotally securing a temple piece of the frame thereto.

* * * * *